United States Patent
Manders et al.

(10) Patent No.: US 11,798,047 B2
(45) Date of Patent: Oct. 24, 2023

(54) SYSTEMS AND METHODS TO REGULATE SALES OF A PRODUCT IN AN ONLINE STORE

(71) Applicant: SHOPIFY INC., Ottawa (CA)

(72) Inventors: Blake Delaney Manders, Ottawa (CA); Dennis Ho, Rockcliffe (CA)

(73) Assignee: SHOPIFY INC., Ottawa (CA)

( * ) Notice: Subject to any disclaimer, the term of this patent is extended or adjusted under 35 U.S.C. 154(b) by 3 days.

(21) Appl. No.: 16/802,744

(22) Filed: Feb. 27, 2020

(65) Prior Publication Data

US 2021/0272172 A1     Sep. 2, 2021

(51) Int. Cl.
*G06Q 30/00* (2023.01)
*G06Q 30/0601* (2023.01)

(52) U.S. Cl.
CPC ..... *G06Q 30/0607* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 5,960,411 | A * | 9/1999 | Hartman | G06Q 30/0605 705/26.81 |
| 8,255,288 | B1 * | 8/2012 | Gupta | G06Q 30/06 705/26.41 |
| 8,315,918 | B1 * | 11/2012 | Karonis | G06Q 40/04 705/26.3 |
| 9,202,180 | B2 * | 12/2015 | Denker | G06Q 30/06 |
| 9,264,151 | B1 * | 2/2016 | Emigh | H04W 4/23 |
| 9,659,303 | B2 * | 5/2017 | Orun | G06Q 30/0225 |
| 10,007,776 | B1 * | 6/2018 | Bailey | H04L 63/10 |
| 10,417,664 | B2 * | 9/2019 | Barak | G06Q 30/0235 |
| 10,817,831 | B1 * | 10/2020 | Polyanskiy | G06Q 10/02 |
| 2006/0173750 | A1 * | 8/2006 | Naley | G06Q 30/0641 705/26.81 |
| 2008/0209223 | A1 * | 8/2008 | Nandy | G06F 21/36 713/185 |

(Continued)

FOREIGN PATENT DOCUMENTS

WO     2016154249 A1     9/2016

OTHER PUBLICATIONS

Ruby Goradia "What is Captcha & Why It is Important for eCommerce Site?" Retrieved from https://ecommerceacademy.in/what-is-captcha-why-it-is-important-for-ecommerce-site/ (Year: 2022).*

(Continued)

*Primary Examiner* — Naeem U Haq

(57) ABSTRACT

System and methods are provided to regulate sales of a product in an online store using computer-implemented delays. The computer-implemented delays can, for example, help mitigate the use of bots in the online store, provide different customers with equal access to the product and/or provide certain customers with priority access to the product. According to an embodiment, a method includes receiving an indication that a user intends to purchase an item of a product in an online store, and determining a delay for a sale of the item to the user to regulate sales of the product. Before completing the sale of the item to the user, the delay is implemented in the online store.

24 Claims, 7 Drawing Sheets

(56) References Cited

U.S. PATENT DOCUMENTS

| | | | | |
|---|---|---|---|---|
| 2009/0113294 A1* | 4/2009 | Sanghavi | ............ | G06F 40/103 715/269 |
| 2009/0228368 A1* | 9/2009 | Brown | ............ | G06Q 40/00 705/26.1 |
| 2011/0029370 A1* | 2/2011 | Roeding | ............ | G06Q 30/00 705/14.38 |
| 2011/0082769 A1* | 4/2011 | Hatfield | ............ | G06Q 10/087 705/26.61 |
| 2011/0264555 A1* | 10/2011 | Turner-Rielle | ............ | G06Q 30/06 705/26.8 |
| 2012/0078673 A1* | 3/2012 | Koke | ............ | G06Q 10/087 705/7.13 |
| 2013/0007875 A1* | 1/2013 | Jakobsson | ............ | G06F 3/0486 726/19 |
| 2013/0311375 A1* | 11/2013 | Priebatsch | ............ | G06Q 30/06 705/44 |
| 2013/0339071 A1* | 12/2013 | Hirose | ............ | G06Q 10/02 705/5 |
| 2014/0279279 A1* | 9/2014 | Wilman Rego | ... | G06Q 30/0637 705/26.82 |
| 2018/0240181 A1* | 8/2018 | Lopez | ............ | G06Q 10/08355 |
| 2020/0394673 A1 | 12/2020 | Roberts | | |

OTHER PUBLICATIONS

No Author, "An introduction to e-commerce and distributed applications" The Open University, Oct. 2018. Retrieved from http://www.open.edu/openlearn/science-maths-technology/computing-and-ict/information-and-communication technologies/introduction-ecommerce-and-distributed-applications/content-sect (Year: 2018).*

"A methodology for workload characterization of e-commerce sites," by Daniel A. Menasce; Rodrigo Fonesca; Virgilio A.F. Almedia; and Marco A. Mendes. Proceedings of the first ACM conference on Electronic Commerce. pp. 119-128. Published 1999.

* cited by examiner

FIG. 2

SYSTEMS AND METHODS TO REGULATE SALES OF A PRODUCT IN AN ONLINE STORE

FIELD

The present application relates to e-commerce, and in particular embodiments, to regulating sales of a product in an online store.

BACKGROUND

A merchant may offer a product for sale with an expectation that the product will sell out in a relatively short amount of time. For example, the merchant might anticipate that demand for the product will quickly exceed the merchant's supply of the product, such as in the case of a product drop or a flash sale. A product that is expected to sell out may be referred to as an "exclusive product". A merchant that intends to offer an exclusive product for sale in an online store might wish to in some way manage, control or regulate sales of the product.

SUMMARY

Some embodiments of the present disclosure relate to systems and methods that can regulate sales of a product in an online store using computer-implemented delays. These delays can regulate sales in a flexible manner without placing strict limits on the sales of the product and can be effective at mitigating the use of automated applications or "bots" to purchase the product.

According to one aspect of the present disclosure, a computer-implemented method is provided. The computer-implemented method includes: receiving an indication that a user intends to purchase an item of a product in an online store; determining a delay for a sale of the item to the user to regulate sales of the product; and, before completing the sale of the item to the user, implementing the delay in the online store.

In some embodiments, the method further includes, after implementing the delay in the online store: completing the sale of the item to the user; or determining that an inventory of the product has been depleted and outputting an indication that the sale cannot be completed.

In some embodiments, the method further includes obtaining a priority of the user, where determining the delay is based on the priority of the user.

In some embodiments, obtaining the priority of the user includes determining the priority based on an assessment that the user is using an automated application to access the online store.

In some embodiments, obtaining the priority of the user includes determining the priority based on a purchase history of the user.

In some embodiments, determining the delay for the sale of the item to the user includes determining a fixed delay for the sales of the product.

In some embodiments, implementing the delay using the online store includes delaying execution of one or more steps of a checkout process for the item.

In some embodiments, implementing the delay using the online store includes delaying transmission of content to a device associated with the user.

In some embodiments, implementing the delay using the online store includes: requesting input from the user; receiving the input from the user; determining, after receiving the input from the user, that an elapsed time is less than the delay; and requesting further input from the user.

In some embodiments, receiving the indication that the user intends to purchase the item of the product through the online store includes receiving a selection of the product in the online store.

In some embodiments, receiving the indication that the user intends to purchase the item of the product through the online store includes receiving an application programming interface call to purchase the item of the product.

In some embodiments, the method further includes: receiving, from a merchant associated with the product, a request to regulate the sales of the product; and storing the request in memory. In these embodiments, determining the delay for the sale of the item to the user includes determining that the sales of the product are regulated.

According to another aspect of the present disclosure, a system is provided. The system includes: memory to store an indication that a user intends to purchase an item of a product in an online store; and at least one processor to: determine a delay for a sale of the item to the user to regulate sales of the product; and before completing the sale of the item to the user, implement the delay in the online store.

In some embodiments, the at least one processor is further to, after implementing the delay in the online store: complete the sale of the item to the user when an inventory of the product has not been depleted; and output an indication that the sale cannot be completed when the inventory of the product has been depleted.

In some embodiments, the at least one processor is further to obtain a priority of the user, where the delay is based on the priority of the user.

In some embodiments, the priority is based on an assessment that the user is using an automated application to access the online store.

In some embodiments, the priority is based on a purchase history of the user.

In some embodiments, the delay for the sale of the item to the user includes a fixed delay for the sales of the product.

In some embodiments, the delay for the sale of the item to the user includes a delay in execution of one or more steps of a checkout process for the item.

In some embodiments, the delay for the sale of the item to the user includes a delay in transmission of content to a device associated with the user.

In some embodiments, the at least one processor is further to: request input from the user; receive the input from the user; determine, after receiving the input from the user, if an elapsed time is less than the delay; and request further input from the user when the elapsed time is less than the delay.

In some embodiments, the indication that the user intends to purchase the item of the product through the online store includes receipt of a selection of the product, by the user, in the online store.

In some embodiments, the indication that the user intends to purchase the item of the product through the online store includes receipt of an application programming interface call, sent by the user, to purchase the item of the product.

In some embodiments, the at least one processor is further to receive, from a merchant associated with the product, a request to regulate the sales of the product, and to determine, based on the request, that the sales of the product are regulated. In such embodiments, the memory is further to store the request.

BRIEF DESCRIPTION OF THE DRAWINGS

Embodiments will be described, by way of example only, with reference to the accompanying figures wherein:

FIG. 2 is an example of a home page of an administrator, according to an embodiment;

DETAILED DESCRIPTION

For illustrative purposes, specific example embodiments will now be explained in greater detail below in conjunction with the figures.

Example e-Commerce Platform

In some embodiments, the methods disclosed herein may be performed on or in association with a commerce platform, such as an e-commerce platform. Therefore, an example of a commerce platform will be described.

Figure 1:
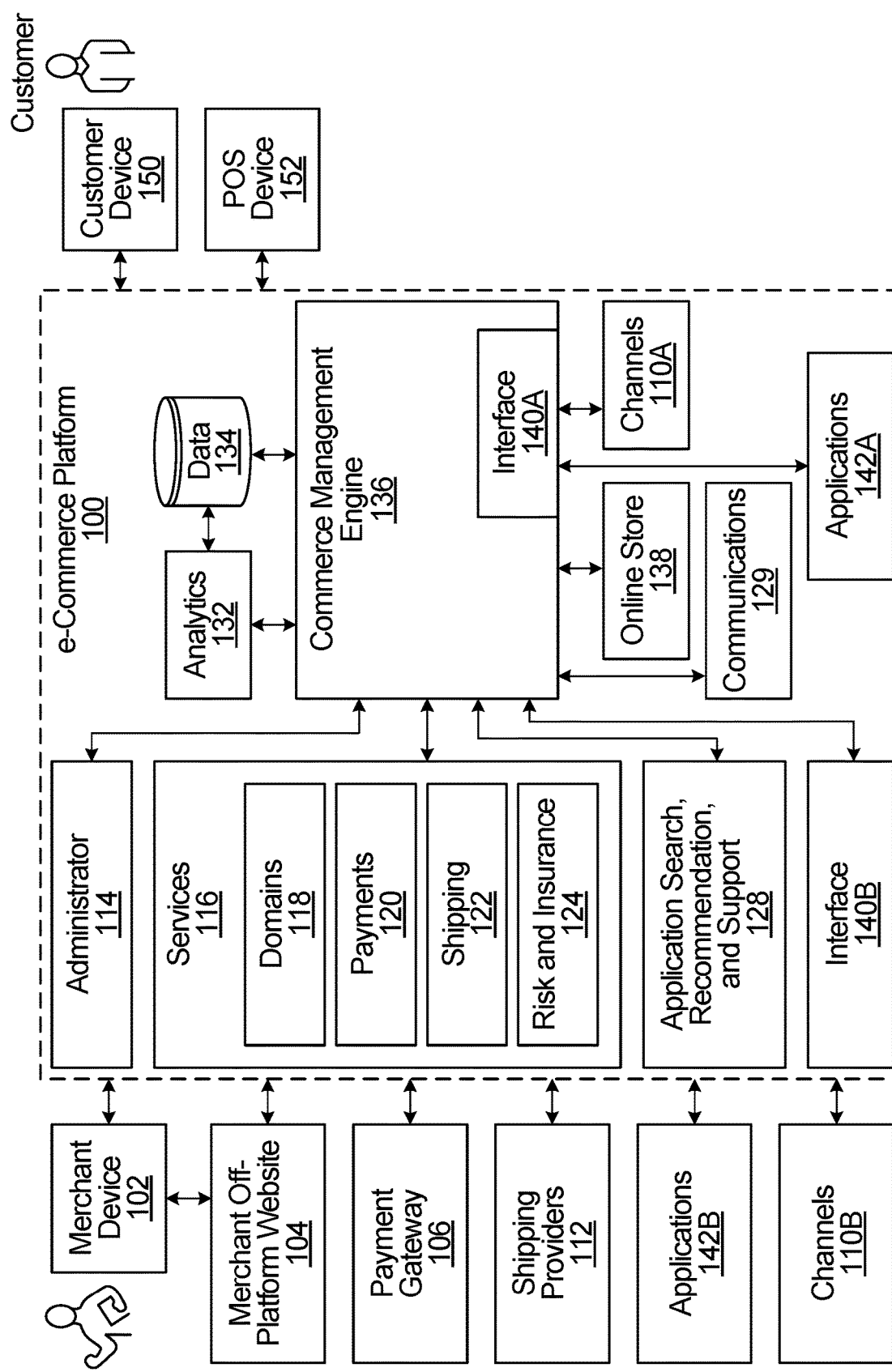
FIG. 1 is a block diagram of an e-commerce platform, according to an embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152

(e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
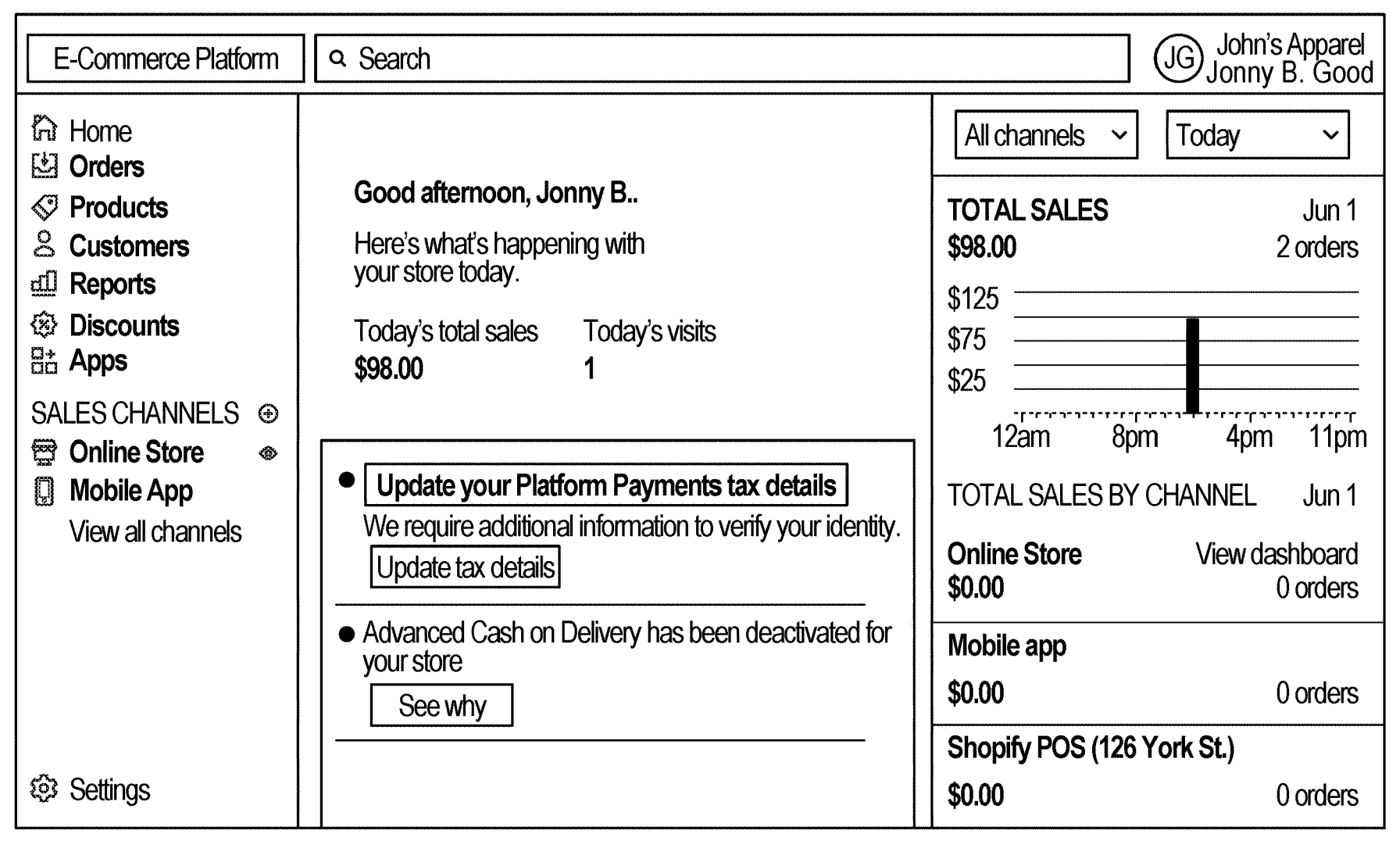

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Regulating Sales on an e-Commerce Platform

Figure 3:
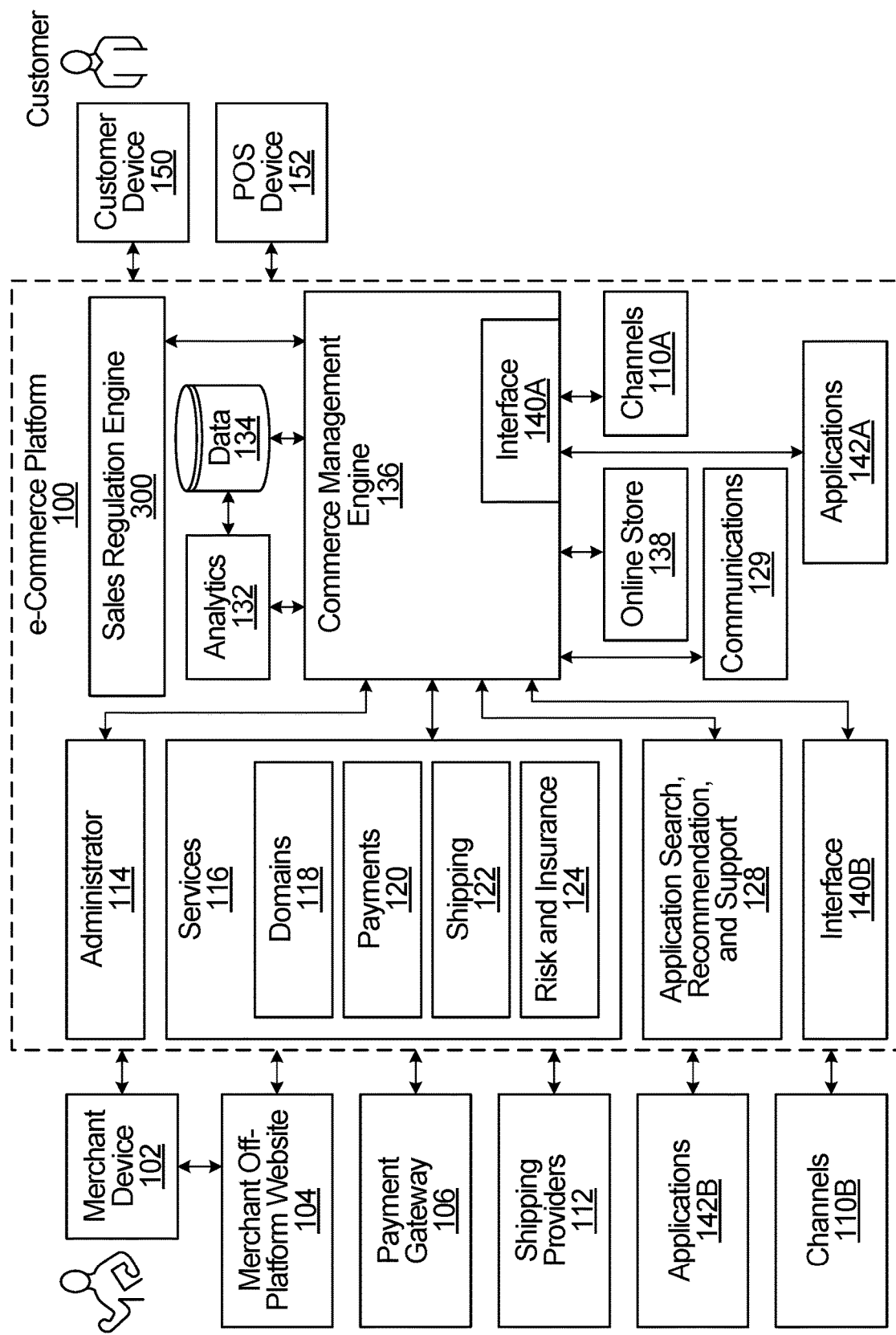
FIG. 3 illustrates the e-commerce platform of FIG. 1, but including a sales regulation engine.

FIG. 3 illustrates the e-commerce platform 100 of FIG. 1, but including sales regulation engine 300. The sales regulation engine 300 is an example of a computer-implemented system that can manage, regulate and/or control sales of any or all products on the e-commerce platform 100. In some implementations, the sales regulation engine 300 regulates the sales of products in the online store 138. Regulating the sales of a product can include, inter alfa: regulating which customers can purchase the product; regulating when a customer can purchase the product; regulating how quickly a customer can purchase the product; and regulating how many items of the product a customer can purchase. When sales of a product are being regulated, that product may be referred to as a "regulated product".

Although the sales regulation engine 300 is illustrated as a distinct component of the e-commerce platform 100 in FIG. 3, this is only an example. A sales regulation engine could also or instead be provided by another component residing within or external to the e-commerce platform 100. In some embodiments, a sales regulation engine is integrated with the online store 138. In some embodiments, either or both of the applications 142A-B provide a sales regulation engine that is available to merchants. Furthermore, in some embodiments, the commerce management engine 136 provides a sales regulation engine. The e-commerce platform 100 could include multiple sales regulation engines that are provided by one or more parties. The multiple sales regulation engines could be implemented in the same way, in similar ways and/or in distinct ways. In addition, at least a portion of a sales regulation engine could be implemented in the merchant device 102. For example, the merchant device 102 could store and run a sales regulation engine locally as a software application.

As discussed in further detail below, the sales regulation engine 300 could implement at least some of the functionality described herein. Although the embodiments described below may be implemented in association with an e-commerce platform, such as (but not limited to) the e-commerce platform 100, the embodiments described below are not limited to e-commerce platforms. For example, online stores and/or sales regulation engines that are implemented independent of an e-commerce platform are contemplated.

Computer-Implemented Methods for Regulating Sales

Regulating product sales can be implemented for any of a number of different reasons. For example, a merchant may regulate the sales of a product for the purpose of:

Ensuring that all customers have an equal opportunity to purchase the product;

Inhibiting a customer from purchasing more than one item of the product;

Inhibiting customers from automating the purchase of the product using computer applications or "bots"; and/or Giving loyal customers (for example, customers that have shopped with the merchant before) priority to purchase the product.

The motivation to regulate sales of a product in an online store can at least partially stem from some of the challenges associated with e-commerce and online shopping. For example, mitigating the use of bots that can interact with computer infrastructure to automate purchases from an online store is a common challenge. In particular, bots have been implemented to target exclusive products. The speed at which bots can operate means that bots can purchase a large amount of an exclusive product before legitimate customers have had an opportunity to purchase the product. The operator of the bot might then re-sell the exclusive product at an inflated price. This creates a poor shopping experience for the customers and may dissuade some customers from even attempting the purchase. A common example of this use of bots is in the sale of concert tickets and other event tickets, which often have a limited quantity and a relatively high demand.

Another challenge associated with e-commerce and online shopping is creating a user experience that is intuitive and easy to understand for all customers. However, this is not always achievable. As a result, experienced customers may be able to navigate an online store and make purchases more quickly than inexperienced shoppers. This may give experienced shoppers a better chance at purchasing an exclusive product compared to inexperienced shoppers. Implementing systems and methods that can reduce, mitigate or even eliminate the advantage that experienced shoppers have over inexperienced shoppers is a challenge faced by some online stores and e-commerce platforms.

One method for regulating the sale of a product in an online store is restricting the customers that are permitted to purchase the product. Using a sales regulation engine, for example, a merchant could define one or more conditions that a customer must satisfy before the customer is permitted to purchase the product. The sales regulation engine then processes each potential sale of the product to determine if the associated customer meets the one or more conditions. In effect, this restricts the number of customers who have access to the product. However, placing strict limits on the customers that can purchase a product can have disadvantages. For example, this method could overly restrict sales of the product and might annoy some customers that are blocked from purchasing the product.

In one example of regulating sales of an exclusive product, a merchant might want to inhibit the use of bots to purchase the exclusive product. Some merchants, online stores and/or e-commerce platforms have ways to detect the use of bots, but this detection is not always reliable. For example, many bots are designed to mimic the behaviour of a legitimate customer in certain ways. As such, there may be instances where bots can successfully purchase a product without even being detected as a bot and instances where a human customer might appear to be using a bot. Thus, the merchant might not want to block all customers that appear to be using bots, as this would risk blocking a human customer from an exclusive product.

In some cases, a completely automated public Turing test to tell computers and humans apart (CAPTCHA) is used to detect and mitigate bots. A CAPTCHA is intended to determine if a user is human or not. If a CAPTCHA determines that a user is a bot, then an online store could block the user from purchasing regulated products. However, even when a CAPTCHA can successfully determine if a user is human or not, bots can still be used to at least partially automate the purchase of a product from an online store. For example, when a CAPTCHA is used in a checkout process for an exclusive product, then the involvement of a human user might be needed to solve the CAPTCHA. However, a bot could still be used to automate and speed up the rest of the checkout process.

In another example of regulating sales of an exclusive product, a merchant might want to give loyal customers first access to a regulated product. However, the merchant does not want to completely stop other customers from buying the product. For example, if the requirements to qualify as a loyal customer are too strict, then sales of the product might be restricted to the point where an exclusive product does not even sell out. Furthermore, allowing only loyal customers to purchase the product might annoy other potential customers. Thus, restricting the sale of the product to loyal customers can be too strict of an approach.

In yet another example of regulating sales of an exclusive product, a merchant might want to inhibit customers from buying more than one item of a regulated product until other customers have had a fair opportunity to purchase the product. Implementing a condition that each customer is limited to only one item would allow other customers the opportunity to purchase the product, but might ultimately annoy customers and reduce sales. Furthermore, this condition might encourage customers to attempt to bypass the limitation by creating additional accounts on the online store and/or using additional devices to purchase additional items of the product.

In view of the above, a need exists for methods and corresponding systems that can regulate sales of a product in a flexible manner, without placing strict limits on the sales of the product. In particular, a need exists for methods of regulating product sales that can effectively mitigate the use of bots.

According to an aspect of the present disclosure, delays are actively configured and implemented by an online store to flexibly regulate sales of a product. In effect, these delays intentionally slow down customers that are attempting to purchase an item of the product in the online store. By appropriately configuring and implementing the delays, the online store can allow a merchant to mitigate the use of bots, provide certain customers with priority access to the product, and/or provide different customers with equal access to the product.

Figure 4:
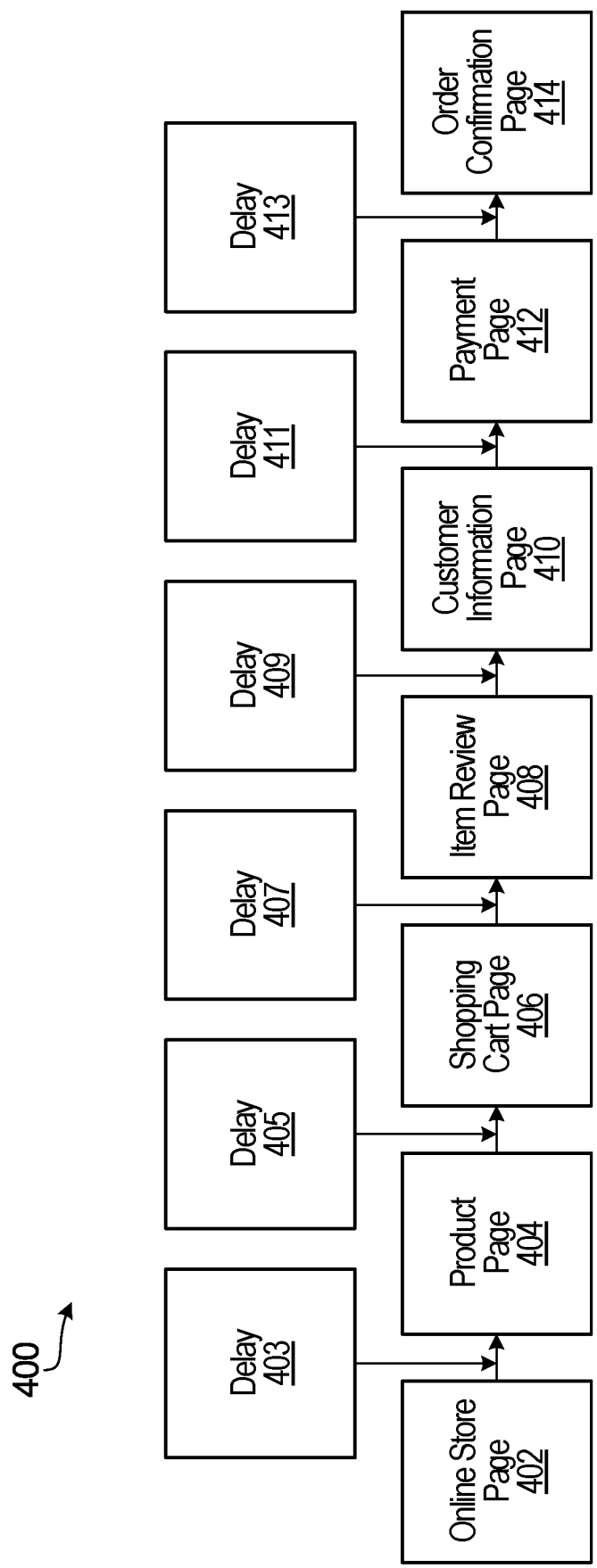
FIG. 4 is a flow diagram illustrating a process for purchasing an item of a regulated product using an online store, according to an embodiment.

A delay could be implemented at any point during the process of purchasing a regulated product. FIG. 4 is a flow diagram illustrating an example process 400 for purchasing an item of a regulated product using an online store. The process 400 is performed using a customer device communicating with the online store. For example, the process 400 could be performed by the customer device 150 purchasing an item from the online store 138 of the e-commerce platform 100. However, the process 400 could also or instead be performed by a customer device purchasing an item from an online store that is independent of a commerce platform. As shown, the process 400 performed by the customer device represents pages requested and received from the online store but it is important to note the process 400 could equally be performed by the online store (e.g. online store 138). In that scenario, the process 400 represents pages requested (via HTTP requests for example) and transmitted by the online store to the customer device to carry out the purchase.

The process 400 begins with the customer viewing an online store page 402 on the customer device. The online store page 402 could be a general home page of the online store, for example. The online store page 402 allows a customer to search for the regulated product being sold. When the customer locates the regulated product, the customer can choose to be directed to a product page 404 for the regulated product. From the product page 404, the customer can add one or more item(s) of the regulated product to their shopping cart. The customer can then navigate to a shopping cart page 406. The shopping cart page 406 displays at least the item(s) of the regulated product that the customer previously added to their shopping cart. From the shopping cart page 406, the customer can initiate a checkout process for the regulated item. The first step of the checkout process includes an item review page 408, through which the customer can confirm the details of the item(s) in their shopping cart before continuing with the checkout process. After the item review page 408, a customer information page 410 is displayed to the customer. The customer information page 410 requests customer input, such as the input of the customer's shipping address, billing address and contact information, for example. Once the customer information page 410 has been completed, the customer can proceed to the payment page 412. The payment page 412 also requests customer input, including the customer's payment information. In some implementations, some or all of the information requested in the customer information page 410 and/or the payment page 412 could be stored by the online store and be auto-populated for the customer. The payment page 412 includes an option for the customer to complete the checkout process after the payment information has been entered. This option completes the sale of the item(s) to the customer and creates an order for the merchant. After the checkout process is completed, the customer is directed to an order confirmation page 414 that confirms the order has been placed and may also display the details of the order.

It should be noted that the process 400 is only one example of a process for purchasing a product using an online store. Other processes are also contemplated, which may include more or fewer pages.

The process 400 need not be performed entirely by the customer manually navigating the pages 402, 404, 406, 408, 410, 412, 414 using the customer device. Instead, the process 400 could be performed at least in part through a checkout application programming interface (API). The checkout API could allow a customer device to complete the steps corresponding to one or more of the pages 402, 404, 406, 408, 410, 412 by making an API call to the online store. In an example, a customer device might make multiple API calls to complete the process 400 and place an order for the product. In another example, the customer device might simply make one API call that includes all the necessary information to complete the process 400.

In the process 400, the sale of the regulated product to the customer can be regulated using one or more delays 403, 405, 407, 409, 411, 413, which act to slow down the process 400 performed by the customer device. The delays 403, 405, 407, 409, 411, 413 could be implemented in a number of ways, either at the online store (e.g. by a sales regulation engine or the customer device). For example, they could be implemented before the respective pages 404, 406, 408, 410, 412, 414 are transmitted and/or displayed on the customer device, in response to receiving a request to transmit a page 404, 406, 408, 410, 412, 414 from the customer device, or by instructing the customer device to implement the delay before displaying the page 404, 406, 408, 410, 412, 414. Although multiple delays are illustrated in FIG. 4, regulating sales of the product does not require that all of the delays 403, 405, 407, 409, 411, 413 are implemented. In general, any one or more of the delays 403, 405, 407, 409, 411, 413 can be implemented to regulate sales of the product.

The way in which the delays 403, 405, 407, 409, 411, 413 are implemented is not limited herein. In general, delays can be divided into two types: system delays and user delays. A system delay is implemented and controlled by a computer system. For example, a system delay can be implemented by a computer system waiting a certain amount of time before executing a process (e.g. displaying a page 404, 406, 408, 410, 412, 414). In some cases, a system delay is implemented by delaying the transmission of content to a customer device. This content could be a screen page (such as any of the pages 404, 406, 408, 410, 412, for example) that the customer needs to access in order to initiate and/or complete a checkout process. A user delay is controlled at least in part by a user. In some cases, a user delay is implemented using a request for user input. An example of a request for user input is a CAPTCHA. The length of time that it takes a user to complete a CAPTCHA provides a form of user delay.

Delays can be implemented regardless of whether the customer is manually navigating the pages 402, 404, 406, 408, 410, 412, 414 or using a checkout API. For example, even if the customer makes a single API call to complete the process 400 and place an order for the product, the delay 413 could still be used to delay completing the sale of the product. CAPCHAs could also be sent to a customer that is using the checkout API, which may provide a form of bot mitigation in addition to providing a delay.

It should be noted that a delay determined for, and implemented in, the sale of a product to a customer is not simply an inherent system delay. Any computer-implemented system will have inherent delays associated with transmitting and processing information, for example. These inherent system delays are distinct from the intentional delays described herein, which are actively determined and implemented by a system. According to some embodiments of the present disclosure, delays used for regulating the sale of a product to a customer are typically in addition to inherent system delays. Purposefully implementing delays in a computer process might be considered counterintuitive, as computer processes are often designed with the goal of increasing speed. However, at least in the case of exclusive products sold in an online store, a delay for the sale of the product to a customer can be beneficial in terms of regulating the sales of the product.

In some embodiments, one or more of the delays 403, 405, 407, 409, 411, 413 provide a fixed time delay that is implemented for all customers that wish to purchase an item of a product. In other words, every customer will have to wait at least a predetermined amount of time before being permitted to place an order for the product. This could be useful for ensuring that different customers have equal access to the product and to ensure that the product is sold in an impartial way. Regardless of how quickly experienced and inexperienced customers can navigate through the pages 404, 406, 408, 410, 412, 414, the fixed time delay will limit how quickly the customers can purchase the product. For example, the delay could help ensure that products are sold on a first-come first-served basis.

Consider, for example, a case in which a regulated product is sold in an online store using the process 400 and goes on sale at a particular time. Different customers (for example, experienced and inexperienced customers) may take different amounts of time to complete the process 400 and place an order for the product. In particular, the process 400 includes the customer information page 410 and the payment page 412 that require customer input, which some customers may take longer to complete than others. Furthermore, to inhibit the ability of bots to purchase the product, one or more of the delays 403, 405, 407, 409, 411, 413 can include a CAPTCHA or other challenge that is intended to be solvable only by humans. Some customers might be relatively slow at completing CAPTCHAs compared to other customers. Thus, the customer information page 410, the payment page 412 and a CAPTCHA might unfairly prejudice some customers. Even if an inexperienced customer has initiated the process 400 before an experienced customer, the experienced customer could complete the process 400 first and place an order for the regulated product before the inexperienced customer. When supply of the regulated product is limited, this could result in the experienced customer successfully purchasing the last item of the product before the inexperienced customer.

A fixed or minimum time delay can be implemented to help balance the length of time that it takes customers to complete the process 400. In an example, a fixed delay time of 60 seconds can be implemented for the process 400. This delay defines the minimum amount of time between when a customer first indicates their intention to purchase an item of a regulated product (using the product page 404, for example) and when the customer completes the checkout process and receives the order confirmation page 414. One or more variable delays could be used to ensure the fixed or minimum time delay runs out before the process 400 completes. For example, in the event that a customer can complete the steps of the process 400 in less than the fixed delay time, then the online store could configure the delay 413 such that at least the full 60 seconds has elapsed before the process 400 can complete. Thus, the delay 413 could be actively or dynamically determined based on how long the customer took to complete the process 400 up to that point. Additional steps that require customer input could also or instead be implemented. For example, additional and/or more time-consuming CAPTCHAs could be used to occupy the customer until the fixed delay time has elapsed. This can prevent the customer from moving forward with additional purchases from additional accounts during a delay.

Even if an item of a regulated product is reserved as soon as the product is selected by a customer (for example, when the product is added to the customer's cart from the product page 404), a fixed time delay could still improve the impartiality of sales of the product. For example, when customers are only permitted to purchase one item at a time, then a customer who can complete the process 400 twice as fast as another customer might be able to purchase two items of the product in the same time that the other customer can purchase one. Implementing a fixed delay time could balance the number of items of the product that different customers are able to purchase.

In some embodiments, the length of one or more of the delays 403, 405, 407, 409, 411, 413 are different for different customers. For example, when a particular customer is performing the process 400, one or more of the delays 403, 405, 407, 409, 411, 413 could be actively configured for (and optionally be specific to) that customer. In some cases, customers are assigned respective priorities that are used to determine and configure any or all of the delays 403, 405, 407, 409, 411, 413 in the process 400. A relatively long delay may be implemented for customers with a low priority, whereas a short delay or even no delay may be implemented for customers with a high priority. As such, customers with a higher priority may be able to complete the process 400 more quickly and purchase a regulated product before customers with a lower priority. When supply of the regulated product is limited, the higher priority customers are more likely to obtain the product before the supply is depleted.

The priority of a customer can be determined based on any of a number of different factors or conditions. In some cases, the priority of a customer is quantified. For example, a priority value between 0 and 10 could be calculated for a customer. In other cases, a customer is placed in a predetermined priority grouping. For example, two groupings of "low priority" and "high priority" could be defined.

Non-limiting examples of factors that suggest a higher priority for a customer include:
  The customer being a repeat and/or long-term customer with a merchant. For example, if the customer's account on an online store or an e-commerce platform is associated with multiple purchases from the merchant, then the customer could be considered a loyal customer that the merchant might want to reward with priority access to exclusive products. In some cases, a loyal customer is defined by a minimum amount spent with a merchant.
  The customer being a frequent shopper on an e-commerce platform. Even if the customer has not shopped with the particular merchant that is selling the regulated product, the merchant might want to attract this customer by giving them priority access to exclusive products.
  The customer being active on social media. For example, if the customer actively reviews products and has a relatively large social media following, then the merchant might want to encourage the customer to promote their products by granting the customer priority access to exclusive products.

Non-limiting examples of factors that suggest a lower priority for a customer include:
  An assessment that the customer is using a bot to access the online store. A merchant might want to discourage or limit the use of bots to purchase items of their products, or at least limit the number of items that can be purchased using a bot. For example, bots might be associated with product re-sellers, rather than customers that intend to use the product themselves.
  The customer has been associated with bot-like activity in the past.
  The customer already having purchased an item of the regulated product.
  The customer being associated with a newly created account on the online store. This might be an indication that the customer has created the account simply to attempt to buy multiple items of a regulated product.

In cases where a customer is limited to purchasing a single item of a regulated product at a time, the customer might use multiple devices to purchase multiple items of the regulated product. Implementing any delays in a checkout process as user delays could inhibit the effectiveness of this behavior. For example, CAPTCHAs require a customer's direct attention to complete. An online store could monitor the customer's activity to ensure that the customer is actively engaged in entering information or completing CAPTCHAs throughout an entire delay time. If no input from the customer is detected for a predetermined length of time (for example, 5 seconds), then the countdown for the delay time could stop. This could inhibit the use of multiple devices by a single customer to overcome a delay implemented for a regulated product.

In terms of bot mitigation, slowing down a checkout process using delays might be more effective than simply restricting bots from the checkout process. As soon as a bot detects that it has been blocked from a checkout process for a regulated product, the bot might terminate its connection to the online store and attempt the checkout process again using a different approach. The bot could repeat this multiple times until it is successful in purchasing the product. This can result in a large amount of bot activity that might be difficult for an online store to manage and mitigate. Thus, simply attempting to block bots from purchasing a product can be ineffective. In contrast, slowing down a bot in a checkout process using a configured delay can keep the bot occupied, which deters the bot from reattempting the checkout process using another approach. The bot might not know if the delay is an inherent system delay or if the delay is an intentional delay, and therefore the bot might not terminate its connection to the online store in the presence of such a delay. As a result, the delay can inhibit the bot's ability to purchase the regulated product and can also reduce the total amount of bot-related activity in the sale of the regulated product.

The process 400 is merely provided by way of example and should not be considered limiting in any way. Delays can more generally be used in any computer-implemented process for purchasing a product in order to regulate sales of the product.

Computer-Implemented Delays for the Sale of an Item

Figure 5:
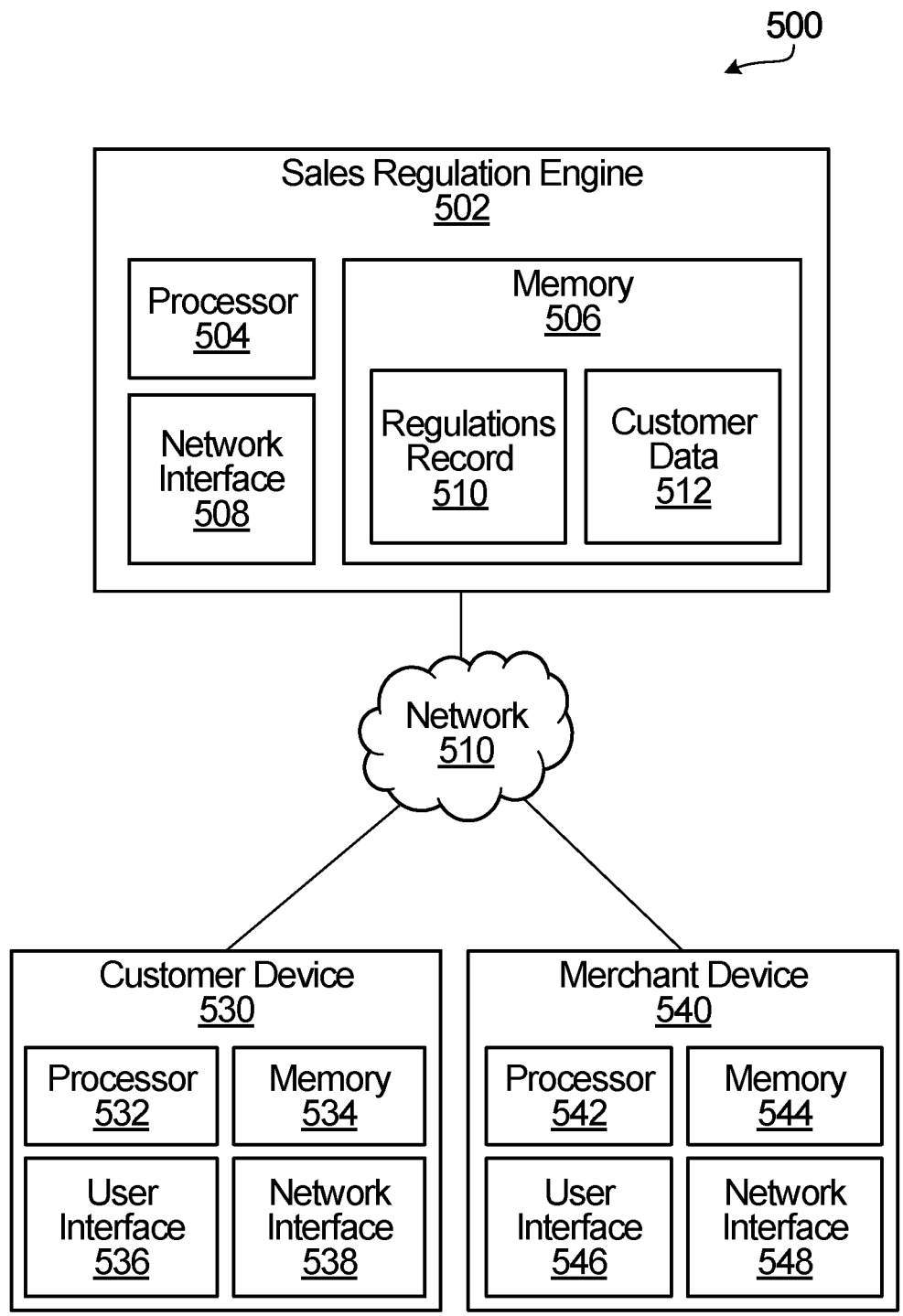
FIG. 5 is a block diagram illustrating a system for configuring and implementing delays for sales of a product, according to an embodiment.

FIG. 5 is a block diagram illustrating an example system 500 for configuring and implementing delays for sales of a product. The system 500 includes a sales regulation engine 502, a network 520, a customer device 530 and a merchant device 540.

The sales regulation engine 502 supports the regulation of product sales in an online store or any other platform for selling products. The location of the sales regulation engine 502 is implementation specific. In some implementations, the sales regulation engine 502 is provided at least in part by an online store, either as a core function of the online store or as an application or service supported by or communicating with the online store. The online store may or may not be supported by a commerce platform such as an e-commerce platform. The sales regulation engine 502 could also or instead be provided by a commerce platform. For example, the sales regulation engine 502 could be the sales regulation engine 300 in the e-commerce platform 100 of FIG. 3. In some implementations, the sales regulation engine 502 is implemented at least in part by a user device, such as a merchant device. Other implementations of the sales regulation engine 502 are also contemplated, such as a stand-alone service to regulate product sales. While the sales regulation engine 502 is shown as a single component, the sales regulation engine 502 could instead be provided by multiple different components that are in communication via the network 520, for example.

The sales regulation engine 502 includes a processor 504, memory 506 and a network interface 508. The processor 504 may be implemented by one or more processors that execute instructions stored in the memory 506. Alternatively, some or all of the processor 504 may be implemented using dedicated circuitry, such as an application specific integrated circuit (ASIC), a graphics processing unit (GPU) or a programmed field programmable gate array (FPGA).

The memory 506 stores a regulations record 510 and customer data 512. The regulations record 510 includes any or all information relating to how the sales of products are regulated by the sales regulation engine 502. For each product regulated by the sales regulation engine 502, the following are non-limiting examples of information that could be included in the regulations record 510:

The name and/or other identifier of the product.
The merchant that sells the product.
A number of items each customer is allowed to purchase in one order.
A number of items each customer is allowed to purchase in total.
One or more conditions that a customer must meet to be permitted to purchase the product. These conditions could include a (minimum) priority of the customer, for example.
One or more CAPCHAs implemented to mitigate the use of bots.
A fixed delay time implemented for every customer purchasing the product.
A variable delay configured and implemented based on customer priority. In one example, the priority of a customer is quantified, and the delay is calculated based on the quantified priority. In another example, the priority of a customer is defined by a priority grouping, and a respective delay is defined for the priority grouping.
The manner by which a delay is implemented. For example, a delay may be implemented as a system delay or as a user delay.
The point at which a delay is implemented. For example, at which point is a delay implemented during the process of purchasing an item of the product.

In some implementations, information in the regulations record 510 is based on requests received from merchants. For example, a merchant could request that sales of one or more of their products be regulated and provide the regulations with the request. The request and the associated regulations could be then stored in the regulations record 510.

In some implementations, information in the regulations record 510 is based on settings defined by an online store. For example, the online store might require that each checkout process include a CAPTCHA to mitigate the use of bots in the online store, which could be stored in the regulations record 510.

The customer data 512 includes information associated with one or more customers. These might be customers of an online store and/or an e-commerce platform, for example. The customers could have an account on the online store and/or have previously used the online store, but this might not always be the case. In implementations where the sales regulation engine 502 is a stand-alone service, the customer data 512 may include information that is obtained from an external source, such as a repository of customer information made available directly by particular customers (for example, via a shopping application installed on a customer device) or by merchant stores (for example, via a database storing their customer information).

For a given customer, the following is a non-limiting list of information that could be included in the customer data 512:

An identity of the customer, such as their name and/or customer number, for example.
A purchase history of the customer, such as a list of each product the customer has purchased on an online store and/or elsewhere.
A list of merchants that the customer has purchased a product from.
Any previous bot-like behaviour from the customer.
Any social media accounts associated with the customer and their activity on those accounts.

The customer data 512 could be obtained in any of a number of different ways. In some implementations, the customer data 512 is provided at least in part by a customer and/or a merchant. The customer data 512 could also or instead be obtained at least in part from a third party, such as from one or more social media platform(s), for example.

The network interface 508 of the sales regulation engine 502 is provided for communication over the network 520. The structure of the network interface 508 is implementation specific. For example, the network interface 508 may include a network interface card (NIC), a computer port (e.g., a physical outlet to which a plug or cable connects), and/or a network socket.

The customer device 530 is an example of a user device. The customer device 530 may be a mobile phone, tablet, laptop or computer owned and/or used by a customer. The customer device 530 includes a processor 532, memory 534, user interface 536 and network interface 538. An example of a user interface is a display screen (which may be a touch screen), a gesture recognition system, a keyboard, and/or a mouse. The network interface 538 is provided for communicating over the network 520. The structure of the network interface 538 will depend on how the customer device 530 interfaces with the network 520. For example, if the customer device 530 is a mobile phone or tablet, the network interface 538 may include a transmitter/receiver with an antenna to send and receive wireless transmissions to/from the network 520. If the merchant device is a personal computer connected to the network with a network cable, the network interface 538 may include, for example, a NIC, a computer port, and/or a network socket. The processor 532 directly performs or instructs all of the operations performed by the customer device 530. Examples of these operations include processing user inputs received from the user interface 536, preparing information for transmission over the network 520, processing data received over the network 520, and instructing a display screen to display information. The processor 532 may be implemented by one or more processors that execute instructions stored in the memory 534. Alternatively, some or all of the processor 532 may be implemented using dedicated circuitry, such as an ASIC, a GPU, or a programmed FPGA.

The merchant device 540 may be a mobile phone, tablet, laptop, or computer owned and/or used by a merchant. The merchant device 540 includes a processor 542, memory 544, user interface 546 and network interface 548. An example of a user interface is a display screen (which may be a touch screen), a keyboard, and/or a mouse. The network interface 548 is provided for communicating over the network 520. The structure of the network interface 548 will depend on how the merchant device 540 interfaces with the network 520. For example, if the merchant device 540 is a mobile phone or tablet, the network interface 548 may include a transmitter/receiver with an antenna to send and receive wireless transmissions to/from the network 520. If the merchant device is a personal computer connected to the network with a network cable, the network interface 548 may include, for example, a NIC, a computer port, and/or a network socket. The processor 542 directly performs or instructs all of the operations performed by the merchant device 540. Examples of these operations include processing user inputs received from the user interface 546, preparing information for transmission over the network 520, processing data received over the network 520, and instructing a display screen to display information. The processor 542 may be implemented by one or more processors that execute instructions stored in the memory 544. Alternatively, some or all of the processor 542 may be implemented using dedicated circuitry, such as an ASIC, a GPU, or a programmed FPGA.

In FIG. 5, one customer device and one merchant device are shown by way of example. In general, more than one customer device and/or merchant device may be in communication with the sales regulation engine 502.

Figure 6:
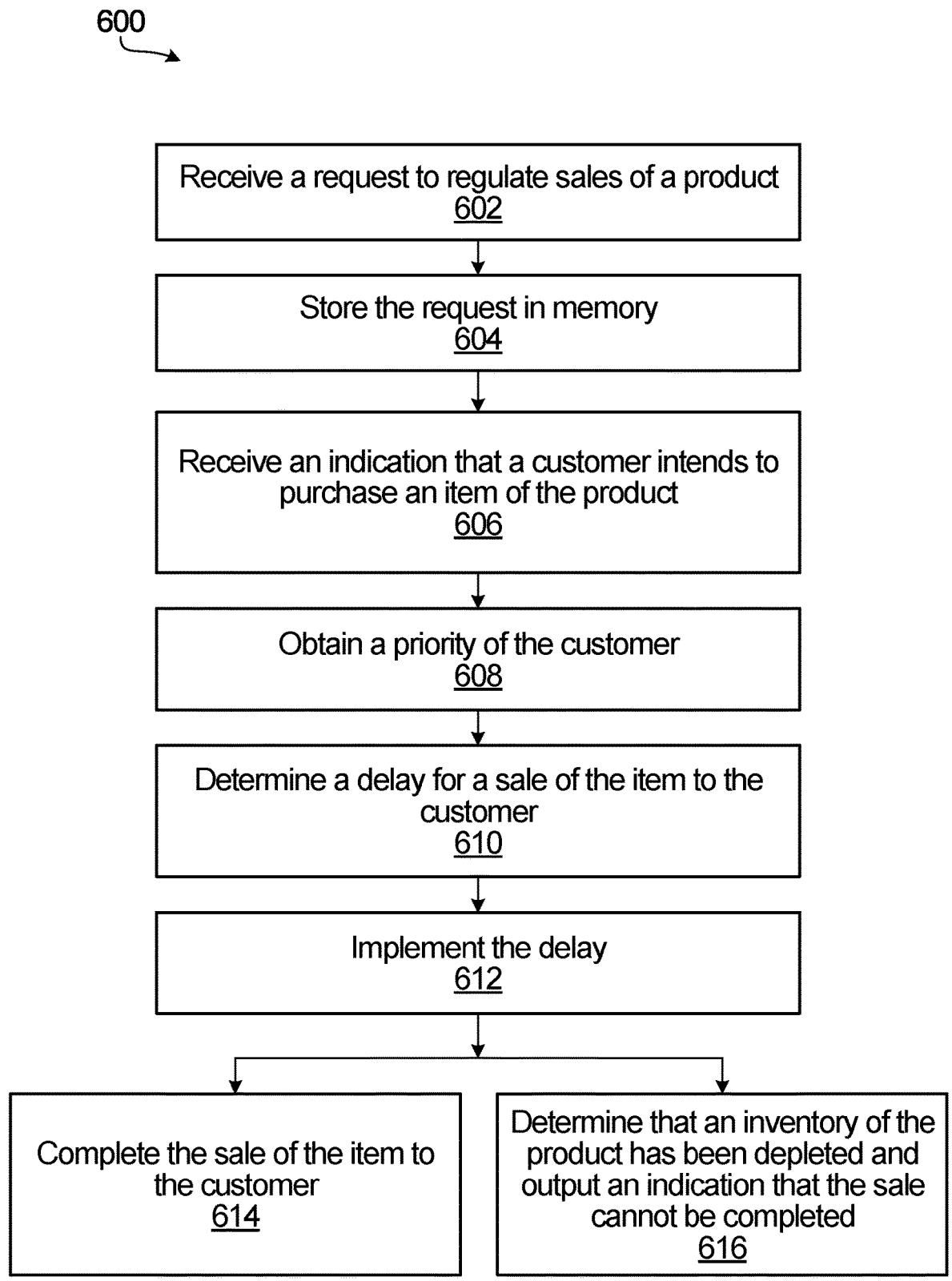
FIG. 6 is a flow diagram illustrating a method for regulating sales of a product, according to an embodiment.

As noted above, the system 500 can be used to regulate the sales of a product. An example of regulating the sales of a product is described below with reference to FIG. 6, which is a flow diagram illustrating a method 600 according to an embodiment. The method 600 will be described as being performed by the sales regulation engine 502 of FIG. 5, where a merchant that sells the regulated product is associated with the merchant device 540, and a customer making a purchase of the regulated product is using the customer device 530.

Step 602 is an optional step that includes the processor 504 receiving a request to regulate the sales of the product. This request could have been generated by and transmitted from the merchant device 540, for example. As such, the merchant can define how sales of the product are regulated and provide this information to the sales regulation engine 502. Examples of generating requests to regulate the sales of a product are provided elsewhere herein.

Step 604 is another optional step that includes storing, in the memory 506, the request to regulate the sales of the product. This allows the sales regulation engine 502 to track which products are regulated and which products are not. The request can be stored in the memory 506 in any of a variety of different ways. For example, the product indicated in the request could be added to the regulated products listed in the regulations record 510. Further, any information regarding the specific regulations to be imposed on sales of the product can be added to the regulations record 510. Examples of this information are provided elsewhere herein. It should be noted that the memory 506 might not store the exact request that is received in step 602, but just the relevant information in the request.

Step 606 includes receiving, by the processor 504, an indication that the customer intends to purchase an item of the product in an online store. This indication could be based on any action taken by the customer (via a customer device) that relates to the purchase of the product e.g. during process 400 of FIG. 4. In some implementations, step 606 includes receiving a selection of the product in the online store. This selection could be made using the customer device 530, for example. In some cases, the selection of the product includes a selection to view a product page for the product. In other cases, the selection of the product includes a selection to add at least one item of the product to a shopping cart. In further cases, the selection of the product includes a selection to proceed to a checkout process for the product. Other cases are also contemplated.

In some implementations, step 606 includes receiving, from the customer device 530, at least one application programing interface (API) call to purchase the item of the product. The API call includes a request to purchase the item, and may further include other information such as a shipping address, a billing address and/or contact information for the customer.

Step 608 is an optional step that includes obtaining a priority of the customer. In some implementations, the priority of the customer is obtained from the customer data 512. In other implementations, the priority of the customer is determined based, at least in part, on information stored in the customer data 512. The priority of the customer can be determined based on a purchase history of the user. This purchase history may be specific to the merchant selling the product, or be a more general purchase history on an e-commerce platform. Customers with a more extensive purchase history might be assigned a higher priority. The priority of the customer can also or instead be determined based on an assessment of whether the customer is using a bot to access the online store. For example, the speed at which the customer is navigating an online store could indicate that the customer is using a bot. Customers that are using bots might be assigned a lower priority than those that are navigating the online store manually. Further details regarding determining the priority of a customer can be found elsewhere herein.

Step 610 includes determining, using the processor 504, a delay for a sale of the item to the customer to regulate sales of the product. In other words, the delay is determined for the purpose of managing, directing, controlling or otherwise regulating sales of the product. In some implementations, step 610 begins with determining that the sales of the product are regulated. For example, the processor 504 could search the regulations record 510 for any regulations pertaining to the product. In the case that no regulations pertaining to the product are present in the regulations record 510, then the processor determines that no delay should be used for selling the product to the customer. Alternatively, if there are regulations pertaining to the product in the regulations record 510, then the processor determines the delay based on these regulations.

In some implementations, the delay determined at step 610 is a fixed delay for all sales of the product. As discussed above, fixed delays can be used for the purpose of ensuring equal access to a product for different customers. The length of the fixed delay could be stored in the regulations record 510, for example.

The length of a fixed time delay could be based on any of a number of different factors. In some cases, the length of the fixed time delay is based on the number of items of the product the merchant has in stock and the amount of time that a merchant intends the sale of the product to last. For example, if a merchant wishes for a sale to last for 30 minutes before the product is sold out, then the fixed time delay for purchasing the product can be selected accordingly.

Although a fixed delay is the same for all customers, different delay times could still be used in different situations. For example, consider a case in which customers are only able to purchase one item of the product at a time (i.e., in one order). A fixed delay time of 60 seconds may be implemented when a customer is buying their first item of the product. If the customer returns to purchase a second item of the product, then an increased delay time of 90 seconds may be implemented to inhibit the customer's ability to purchase more than one item before the supply of the product is depleted. As such, fixed delays are only fixed in the sense that they are the same for all customers. Step 610 can still include determining different fixed delays based on other considerations.

In some implementations, the delay determined at step 610 is variable. In one example, determining the delay at step 610 includes measuring a time period elapsed for completing one or more steps in a process for purchasing a product (e.g. process 400 in FIG. 4) and determining a delay that corresponds to at least the difference between the time period measured and the fixed or minimum delay time. Use of a variable delay can advantageously help balance the length of time that it takes customers to complete a purchase process.

In some implementations, determining the delay is based on the priority of the customer determined at step 608. This can lead to different delays being determined for different customers. In some cases, the priority of the customer corresponds to a predefined priority grouping (for example, "low priority" or "high priority"). The delay is then selected from a discrete set of time delays based on that priority grouping. For example, a customer in a high priority grouping could be assigned a delay of 0 seconds, whereas a customer in a low priority grouping could be assigned a delay of 15 seconds and/or one CAPTCHA. In other cases, the priority of the customer is a continuous variable, and the delay time for the customer could be calculated based on this variable.

Step 612 includes implementing the delay determined at step 610 using the processor 504. Step 612 is performed before completing the sale of the item to the customer. In some cases, step 612 is performed before even attempting to execute the sale of the item to the customer.

The delay could be implemented in step 612 as a system delay and/or as a user delay. In some implementations, step 612 includes delaying the execution of one or more steps of a checkout process for the item. Referring to the example checkout process illustrated in FIG. 4, implementing the delay at step 612 could correspond to implementing any or all of the delays 403, 405, 407, 409, 411, 413. In some implementations, step 612 includes delaying transmission of content to the customer device 530. This content could include a screen page that the customer would use to complete a checkout process for the item. Examples of such screen pages include the pages 402, 404, 406, 408, 410, 412 of FIG. 4.

In some implementations, step 612 includes requesting input from the user in order to occupy the customer for the length of the delay. This requested input could be in the form of a CAPTCHA, for example. The request for input from the user could be transmitted from the sales regulation engine 502 to the customer device 530, and be displayed on the user interface 536. The sales regulation engine 502 then receives the requested input from the user. This input could be entered using the user interface 536 and then transmitted from the customer device 530 to the sales regulation engine 502. Following receipt of the input, the processor could determine if the delay time determined at step 610 has elapsed. If the delay time has elapsed, then step 612 could end. Alternatively, if the elapsed time is less than the delay time, then the sales regulation engine 502 may request further input from the customer in order to continue to occupy the customer for the length of the delay. This has the advantage of preventing the customer from simultaneously attempting to purchase the product using a different device, as the customer is encouraged to focus on entering the requested input.

Step 614 is an optional step that includes completing the sale of the item to the customer using the processor 504 after implementing the delay at step 612. Step 614 could include, for example, generating an order for the item of the product and transmitting the order to the merchant device 540. However, step 614 can only be performed if items of the product remain in stock. If the merchant's inventory of the product has been depleted, then the method 600 may instead perform step 616.

Step 616 is an optional step that includes determining, using the processor 504, that an inventory of the product has been depleted and outputting an indication that the sale cannot be completed. Outputting the indication could include transmitting content to the customer device 530, where the content includes a screen page informing the customer that the sale of the item could not be completed due to a lack of supply.

Example User Interfaces

The delays and other regulations that are implemented for the sale of a product can be defined and configured by the merchant selling the product. For example, a sales regulation engine may provide a user interface through which the merchant can configure the regulations for the sale of a product. This user interface could be used by the merchant to generate the request received in step 602 of the method 600, for example.

Figure 7:
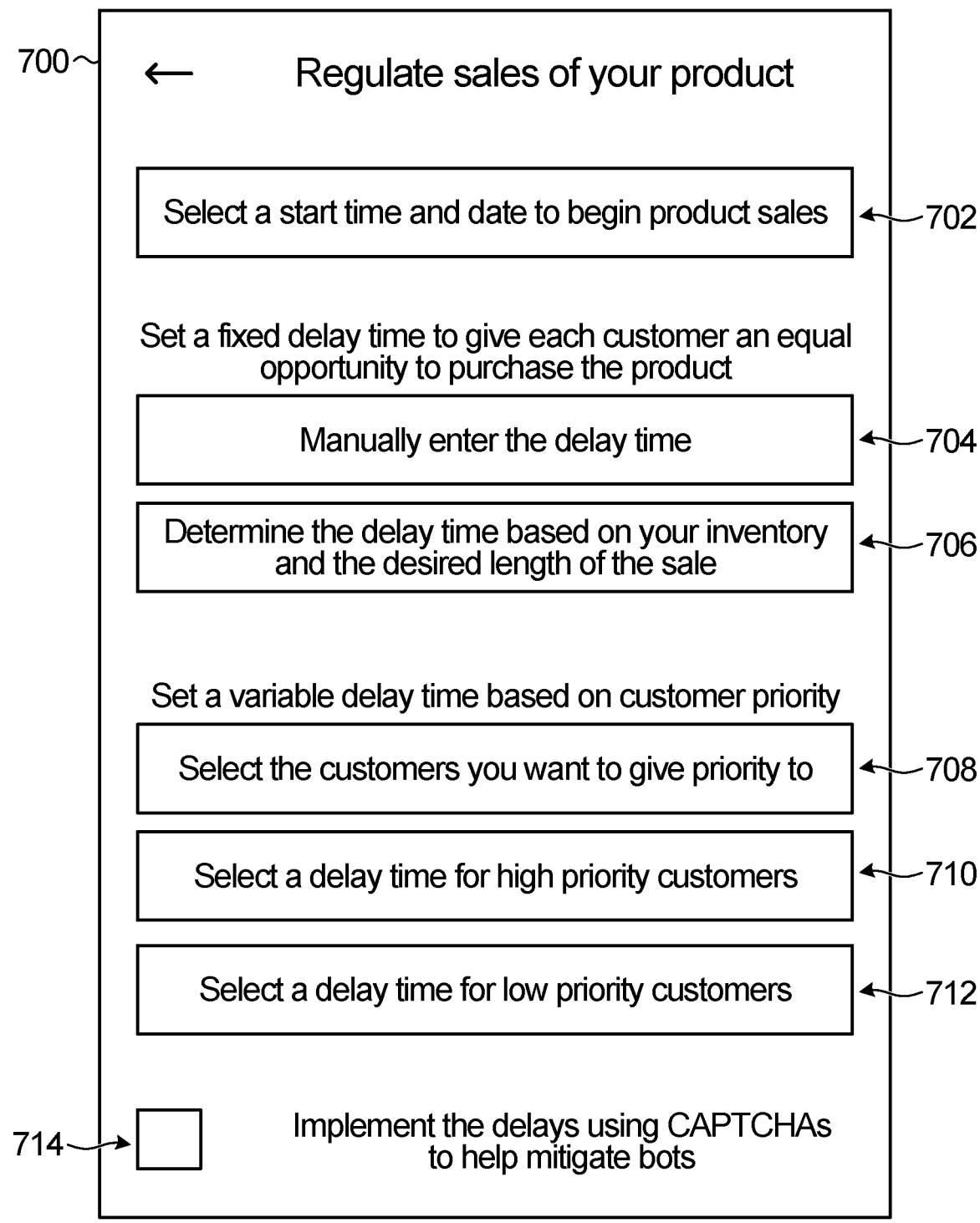
FIG. 7 illustrates a screen page that allows a merchant to configure regulations for sales of a product, according to an embodiment.

FIG. 7 illustrates an example screen page 700 that allows a merchant to configure regulations for sales of a product. Using a merchant device, the merchant can access the screen page 700 when in the process of adding a new product to their online store. For example, the screen page 700 could be accessed from the administrator 114 of FIG. 3.

The screen page includes an option 702 to select a start time and date to release the product for sale. Selecting option 702 could direct the merchant to a calendar to select the start date and a dropdown menu to select the start time. This defines the specific time at which the product becomes available for purchase in the online store, which may provide a product drop or a flash sale.

The screen page also includes an option 704 to manually enter a fixed delay time and an option 706 to determine the fixed delay time based on the merchant's inventory of the product and a desired length of the sale. Selecting the option 704 may provide a dropdown menu from which the merchant can select the delay time. Selecting the option 706 may provide menus for selecting how many items of the product the merchant has in inventory and a desired length of the sale. The online store may then calculate an appropriate delay time based on these inputs. The delay might also be calculated based on an expected popularity of the product, which may be determined based on similar items previously sold by the merchant, for example.

The screen page further includes an option 708 to select the customers that the merchant wants to give priority to. In other words, the option 708 allows the merchant to select high priority customers. Selecting the option 708 could provide the merchant with a series of conditions that a customer must meet to be considered high priority. Non-limiting examples of such conditions include:

An assessment that the customer is not using a bot.

The customer has not been associated with bot-like behaviour in the past.

The customer has shopped with the merchant before.

The customer is a frequent shopper on an e-commerce platform.

The customer is actively engaged in reviewing and promoting products on social media.

Customers that meet the requirements defined using the option 708 would be considered high priority customers by the online store, and customers that do not meet the requirements defined using the option 708 would be considered low priority customers. Options 710, 712 in the screen page 700 then allow the merchant to define the delay time for high priority customers and low priority customers, respectively. For example, each of options 710, 712 could direct the merchant to a dropdown menu to select the respective time delay.

The screen page 700 further includes an option 714 to implement the delays defined using the options 704, 706, 710, 712 as CAPTCHAs. As such, the delays would better mitigate the use of bots. The complexity and/or the number of CAPTCHAs used may be determined based on the merchant's input in the options 704, 706, 710, 712. For example, if the merchant selected a time delay of 10 seconds in the option 704 and then selected the option 714, the online store may determine that a CAPTCHA that the average consumer takes 10 seconds to complete should be implemented. Alternatively, the online store may determine that, for each customer, CAPTCHAs should be repeatedly implemented until the 10 second delay has elapsed.

Entering information into the screen page 700 generates a request to regulate the product. For example, the screen page 700 could be used to generate the request received in step 602 of the method 600.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
receiving, by at least one processor, an indication that a user intends to purchase an item of a product in an online store associated with a computing system; and
implementing, by the at least one processor, an intentional computer delay during a sale of the item to the user in the online store to slow down an automated application, the intentional computer delay defining a particular amount of time by which the sale of the item to the user is to be intentionally slowed down, and wherein the computer system is programmed to implement the intentional computer delay and the intentional computer delay is in addition to a system delay inherent to the computing system;
wherein implementing the intentional computer delay comprises the at least one processor intentionally preventing transmission of content to a device associated with the user until the particular amount of time has passed thereby causing the sale of the item to be prevented until the particular amount of time has passed; and
wherein the particular amount of time by which the sale of the item to the user is to be intentionally slowed down is determined based on how long the user took to complete preceding steps related to the sale of the item by performing operations including:
obtaining, by the at least one processor, a minimum delay time representative of a minimum amount of time that needs to pass between when the indication is received that the user intends to purchase the item and when a checkout process for the sale of the item is complete; and
selecting, by the at least one processor, the particular amount of time as a time duration corresponding to a difference between how long the user took to complete the preceding steps and the minimum delay time.

2. The computer-implemented method of claim 1, further comprising initiating the sale of the item to the user, wherein initiating the sale of the item to the user further comprises:
completing the sale of the item to the user; or
determining that an inventory of the product has been depleted and outputting an indication that the sale cannot be completed.

3. The computer-implemented method of claim 1, further comprising:
obtaining a priority of the user and determining the intentional computer delay based on the priority of the user.

4. The computer-implemented method of claim 3, wherein obtaining the priority of the user comprises determining the priority based on an assessment that the user is using the automated application to access the online store.

5. The computer-implemented method of claim 3, wherein obtaining the priority of the user comprises determining the priority based on a purchase history of the user.

6. The computer-implemented method of claim 1, wherein preventing transmission of the content results in preventing execution of a particular step of the checkout process for the item until the particular amount of time has passed.

7. The computer-implemented method of claim 1, wherein receiving the indication that the user intends to purchase the item of the product through the online store comprises receiving a selection of the product in the online store.

8. The computer-implemented method of claim 1, wherein:
receiving the indication that the user intends to purchase the item of the product through the online store comprises receiving an application programming interface call to purchase the item of the product.

9. The computer-implemented method of claim 1, further comprising:
receiving, from a merchant associated with the product, a request to regulate the sales of the product;
storing the request in memory, and
determining that the sales of the product are regulated, wherein the implementing the intentional computer delay is responsive to the determining that the sales of the product are regulated.

10. The computer-implemented method of claim 1, wherein the content comprises a screen page needed to be accessed by the user to initiate the checkout process.

11. The computer-implemented method of claim 1, wherein the content comprises a screen page needed to be accessed by the user to complete the checkout process.

12. A system comprising:
memory to store an indication that a user intends to purchase an item of a product in an online store associated with a computing system; and
at least one processor to:
implement an intentional computer delay during a sale of the item to the user in the online store to slow down an automated application, the intentional computer delay defining a particular amount of time by which the sale of the item to the user is to be intentionally slowed down, and wherein the computer system is programmed to implement the intentional computer delay and the intentional computer delay is in addition to a system delay inherent to the computing system;
wherein implementing the intentional computer delay comprises intentionally preventing transmission of content to a device associated with the user until the particular amount of time has passed thereby causing the sale of the item to be prevented until the particular amount of time has passed; and
wherein the at least one processor is further to determine the particular amount of time by which the sale of the item to the user is to be intentionally slowed down based on how long the user took to complete preceding steps related to the sale of the item bar performing operations including:
obtaining a minimum delay time representative of a minimum amount of time that needs to pass between when the indication is received that the user intends to purchase the item and when a checkout process for the sale of the item is complete; and
selecting the particular amount of time as a time duration corresponding to a difference between how long the user took to complete the preceding steps and the minimum delay time.

13. The system of claim 12, wherein the at least one processor is further to, after the sale of the item to the user is initiated:
complete the sale of the item to the user when an inventory of the product has not been depleted; or
output an indication that the sale cannot be completed when the inventory of the product has been depleted.

14. The system of claim 12, wherein the at least one processor is further to obtain a priority of the user, wherein the intentional computer delay is based on the priority of the user.

15. The system of claim 14, wherein the priority is based on an assessment that the user is using the automated application to access the online store.

16. The system of claim 14, wherein the priority is based on a purchase history of the user.

17. The system of claim 12, wherein preventing transmission of the content results in preventing execution of a particular step of the checkout process for the item until the particular amount of time has passed.

18. The system of claim 12, wherein the indication that the user intends to purchase the item of the product through the online store comprises receipt of a selection of the product, by the user, in the online store.

19. The system of claim 12, wherein the indication that the user intends to purchase the item of the product through the online store comprises receipt of an application programming interface call, sent by the user, to purchase the item of the product.

20. The system of claim 12, wherein:
the at least one processor is further to receive, from a merchant associated with the product, a request to regulate the sales of the product, and to determine, based on the request, that the sales of the product are regulated; and
the memory is further to store the request.

21. The system of claim 12, wherein the content comprises a screen page needed to be accessed by the user to initiate the checkout process.

22. The system of claim 12, wherein the content comprises a screen page needed to be accessed by the user to complete the checkout process.

23. A non-transitory computer-readable medium storing computer-executable instructions which, when executed by a computer, cause the computer to:

receive an indication that a user intends to purchase an item of a product in an online store associated with a computer system; and implement an intentional computer delay during a sale of the item to the user in the online store to slow down an automated application, the intentional computer delay defining a particular amount of time by which the sale of the item to the user is to be intentionally slowed down, and wherein the computer system is programmed to implement the intentional computer delay and the intentional computer delay is in addition to a system delay inherent to the computing system;

wherein implementing the intentional computer delay comprises intentionally preventing transmission of content to a device associated with the user until the particular amount of time has passed thereby causing the sale of the item to be prevented until the particular amount of time has passed; and wherein the particular amount of time by which the sale of the item to the user is to be intentionally slowed down is determined based on how long the user took to complete preceding steps related to the sale of the item by performing operations including:
obtaining a minimum delay time representative of a minimum amount of time that needs to pass between when the indication is received that the user intends to purchase the item and when a checkout process for the sale of the item is complete; and
selecting the particular amount of time as a time duration corresponding to a difference between how long the user took to complete the preceding steps and the minimum delay time.

24. The non-transitory computer-readable medium of claim 23, wherein the instructions, when executed by the computer, further cause the computer to:
obtain a priority of the user and determine the intentional computer delay based on the priority of the user.

* * * * *

UNITED STATES PATENT AND TRADEMARK OFFICE
CERTIFICATE OF CORRECTION

PATENT NO. : 11,798,047 B2
APPLICATION NO. : 16/802744
DATED : October 24, 2023
INVENTOR(S) : Blake Delaney Manders and Dennis Ho Page 1 of 1

It is certified that error appears in the above-identified patent and that said Letters Patent is hereby corrected as shown below:

In the Claims

At Column 32, Line 50, Claim 12: "the sale of the item bar performing" should be - the sale of the item by performing -

Signed and Sealed this
Fifth Day of December, 2023

Katherine Kelly Vidal
*Director of the United States Patent and Trademark Office*